United States Patent [19]
Kaneko et al.

[11] Patent Number: 5,792,953
[45] Date of Patent: Aug. 11, 1998

[54] ACCELERATION SENSOR HAVING A VIBRATOR WITH AN ATTACHED WEIGHT

[75] Inventors: Takayuki Kaneko, Nagaokakyo; Takeshi Nakamura, Uji, both of Japan

[73] Assignee: Murata Manufcacturing Co., Ltd., Japan

[21] Appl. No.: 711,807

[22] Filed: Sep. 10, 1996

[30] Foreign Application Priority Data

Sep. 11, 1995 [JP] Japan .................... 7-232935

[51] Int. Cl.$^6$ ........................... G01P 15/09
[52] U.S. Cl. .................. 73/514.15; 73/514.29
[58] Field of Search ............. 73/514.01, 514.15, 73/514.16, 514.29, 514.36, 862.51, DIG. 1; 331/65, 66

[56] References Cited

U.S. PATENT DOCUMENTS

| | | | |
|---|---|---|---|
| 4,658,174 | 4/1987 | Albert | 73/514.29 |
| 4,785,215 | 11/1988 | Blech | 310/329 |
| 5,265,473 | 11/1993 | Funabashi | 73/514.15 |

FOREIGN PATENT DOCUMENTS

| | | |
|---|---|---|
| 0030741 | 6/1981 | European Pat. Off. . |
| 0614087 | 9/1994 | European Pat. Off. . |
| 26062886 | 5/1988 | France . |

OTHER PUBLICATIONS

Patent Abstracts of Japan, vol. 94, No. 011, & JP-A-06 314948 (Murata Mfg. Co. Ltd.), 8 Nov. 1994.

*Primary Examiner*—Christine K. Oda
*Attorney, Agent, or Firm*—Ostrolenk, Faber, Gerb & Soffen, LLP

[57] ABSTRACT

An acceleration sensor includes a vibrator having a vibrating member which has a node portion of vibration and vibrates in a longitudinal direction of the member. A support member is provided in one end portion along the length of the vibrating member for supporting the vibrator. A weight is provided at the other end portion along the length of the vibrator, for increasing the flexing of the vibrating member due to acceleration. A first connection section is provided between the weight and the other end of the vibrating member and a second connection section is provided between the weight and the node portion of the vibrating member.

11 Claims, 2 Drawing Sheets

5,792,953

ACCELERATION SENSOR HAVING A VIBRATOR WITH AN ATTACHED WEIGHT

BACKGROUND OF THE INVENTION

1. Field of the Invention

The present invention relates to an acceleration sensor and, more particularly, to an acceleration sensor having a cantilever structure including a vibrator of a bimorph structure.

2. Description of the Related Art

An acceleration sensor is known in which a weight is attached to an end of a vibrating member in a cantilever structure for detecting acceleration.

In such an acceleration sensor provided with the vibrating member, the vibrating member vibrates in a longitudinal direction. When acceleration is applied to the vibrating member in a direction perpendicular to its main surfaces, the vibrating member is flexed together with piezoelectric elements attached on the main surfaces and the piezoelectric elements generate a voltage proportional to the amount of the bending of the vibrating member. Therefore, it is possible to detect acceleration by measuring the voltage.

In the conventional acceleration sensor, if vibration leaks from the vibrating member to the weight mounted at the end of the vibrating member, the vibration of the vibrating member is hampered. Thus, the weight is attached to the end of the vibrating member through slim connection sections so that the vibration of the vibrating member is attenuated by the connection sections.

However, such a structure presents a problem, in that the mechanical strength for supporting the weight by connection sections member is weak. Accordingly, when acceleration is applied to the vibrating member, only the connection sections are bent greatly by the weight subject to the acceleration and the vibrating member is little bent. As a result, it is difficult for displacement of the weight due to acceleration to be surely transmitted to the vibrating member, and thus the sensitivity for detecting acceleration becomes poor. In addition, the connection sections are mechanically weak against a large acceleration or an impact such as falling of the acceleration sensor itself, which results in permanent deformation of the connection sections.

SUMMARY OF THE INVENTION

It is therefore an object of the present invention to solve the above-described problems and to provide an acceleration sensor in which the vibration of the vibrator is not easily obstructed by a weight and which has a high strength for supporting the weight by a vibrator.

According to the present invention, an acceleration sensor includes a vibrator having a vibratable member which has a node portion of vibration and is vibratable in a longitudinal direction, the vibratable member flexing in response to an applied acceleration. A support member is provided in one end portion of the vibratable member for supporting the vibrator. A weight is provided for increasing the flexing of the vibratable member due to acceleration. A first connection section is provided between the weight and an opposite end of the vibratable member and a second connection section is provided for connecting the weight to the node portion of the vibratable member.

In the acceleration sensor of the present invention, by providing a second connection section, connecting the mounting member for mounting a weight to the vibrator, the strength for supporting the weight by the vibrator is increased. In order to prevent vibration from leaking from the vibrator to the weight via this second connection section so as not to hamper the vibration of the vibrator by the weight, the second connection section is connected to the node portion of the vibrator with the smallest displacement and further, the second connection section is formed thin so as to make it easy to absorb the vibration of the vibrator.

Therefore, according to the present invention, since the vibration of the vibrator is not easily hampered by the weight and the strength for supporting the weight by the vibrator is high, when acceleration is applied, the displacement of the weight due to the acceleration can be easily transmitted to the vibrator, and the sensitivity for detecting the acceleration becomes satisfactory.

For the purpose of illustrating the invention, there is shown in the drawings several forms which are presently preferred, it being understood, however, that the invention is not limited to the precise arrangements and instrumentalities shown.

DETAILED DESCRIPTION OF A PREFERRED EMBODIMENT

Figure 1:
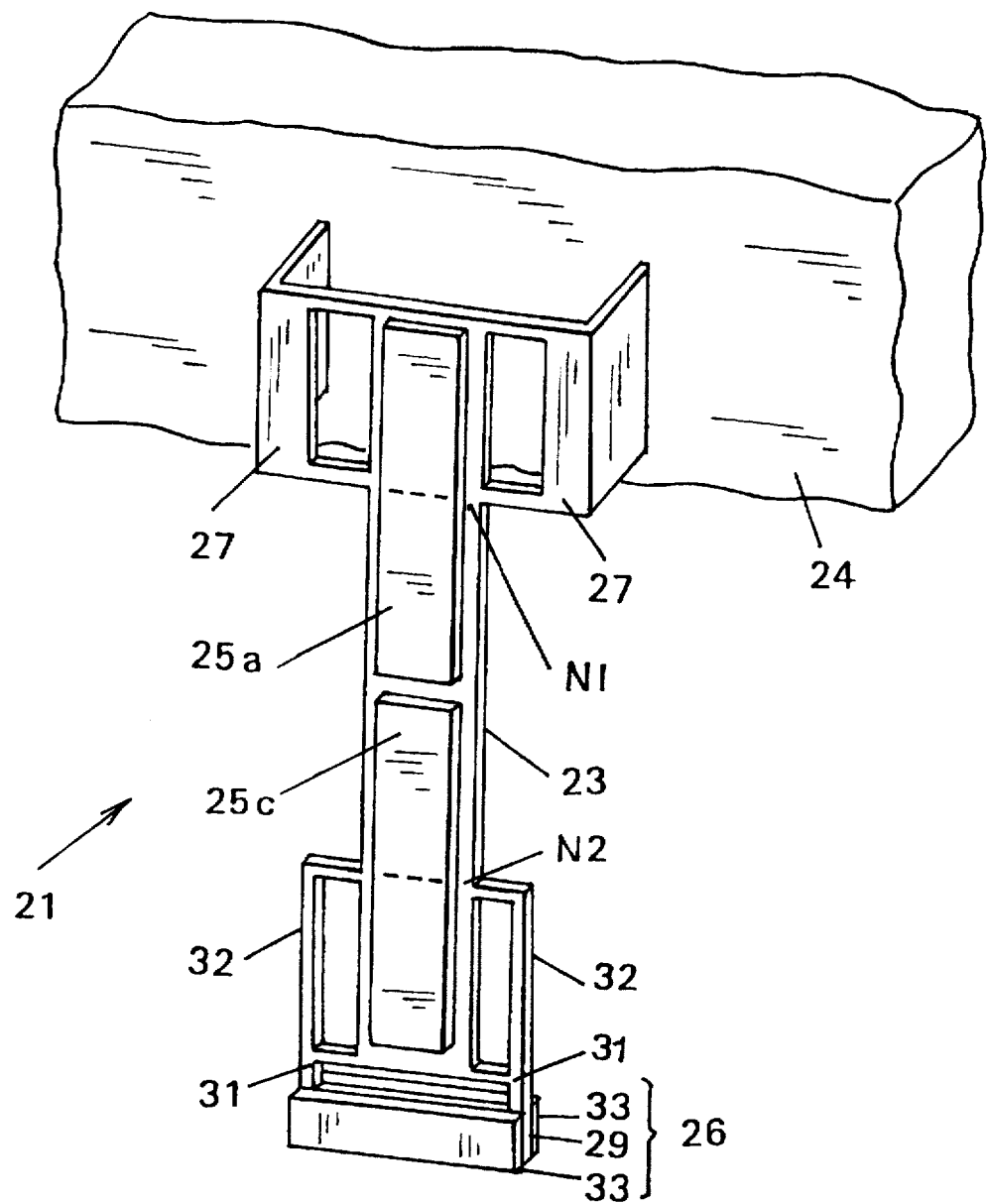
FIG. 1 is a perspective view illustrating an acceleration sensor according to an embodiment of the present invention.
Figure 2:
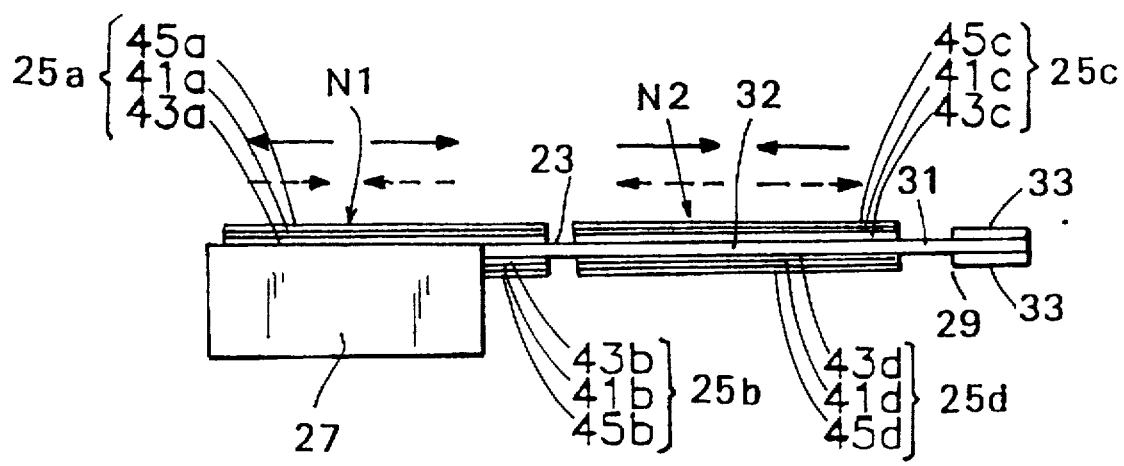
FIG. 2 is a side view of the vibrator of FIG. 1.

An embodiment of the present invention of an acceleration sensor according to the present invention will be described with reference to the accompanying drawings. The acceleration sensor of this embodiment includes a vibrator 21 which vibrates in a longitudinal direction. FIG. 1 is a perspective view illustrating the vibrator 21 and FIG. 2 is a side view thereof.

The vibrator 21 includes a vibrating member 23 in the shape of a strip. The vibrating member 23 is formed from a permanently elastic metallic material such as nickel, iron, chromium, titanium or the alloy thereof (e.g., elinver, or iron-nickel alloy) or the like. The vibrating member 23 may also be formed from a material other than a metal which generally causes a mechanical vibration, such as, for example, quartz, glass, crystals, or ceramics.

Two piezoelectric elements 25a and 25b are formed in such a manner as to face each other on both main surfaces in a portion of the vibrating member 23 extending from the central portion along the length thereof to one end portion thereof. As is best shown in FIG. 2, the piezoelectric elements 25a includes, for example, a piezoelectric layer 41a made of a ceramic, and electrodes 43a and 45a formed respectively on both main surfaces of the piezoelectric layer 41a. The electrode 43a is bonded to one of the main surfaces of the vibrating member 23 by an adhesive material or the like. In a similar manner, the piezoelectric element 25b includes, for example, a piezoelectric layer 41b made of a ceramic, and electrodes 43b and 45b formed respectively on both main surfaces of the piezoelectric layer 41b. The electrode 43b is bonded to the other main surface of the vibrating member 23 by an adhesive material or the like. The piezoelectric layers 41a and 41b of the piezoelectric elements 25a and 25b are polarized in the direction of the width from the electrodes 45a and 45b toward the electrodes 43a and 43b, namely, from the outside toward the vibrating member 23 side.

Further, two piezoelectric elements 25c and 25d are formed in such a manner as to face each other on both main surfaces of the vibrating member 23 in a portion of the vibrating member 23 extending from the central portion along the length thereof to the other end portion thereof. The piezoelectric element 25c includes, for example, a piezoelectric layer 41c made of a ceramic, and electrodes 43c and 45c formed respectively on both main surface of the piezoelectric layer 41c. The electrode 43c is bonded to one main surface of the vibrating member 23 by an adhesive material or the like. In a similar manner, the other piezoelectric element 25c includes, for example, a piezoelectric layer 41d made of a ceramic, and electrodes 43d and 45d formed respectively on both main surfaces of the piezoelectric layer 41d. The electrode 43d is bonded to the other main surface of the vibrating member 23 by an adhesive material or the like. The piezoelectric layers 41c and 41d of the piezoelectric elements 25c and 25d are polarized in the direction of the width from the electrodes 43c and 45c toward the electrodes 43d and 45d, namely, from the vibrating member 23 side toward the outside.

The piezoelectric elements 25a to 25d act as both an actuator for vibrating the vibrating member 23 and a detector for detecting vibration of the vibrating member 23.

Two support members 27 in the shape of an L in cross section are formed in one end portion along the length of the vibrating member 23 so as to support the vibrating member 23. The support member 27 is formed integrally with the vibrating member 23 in such a way that both ends of the support member 27 extend in the direction of the width of the vibrating member 23 and are connected to one end portion along the length of the vibrating member 23 and the node portion N1 of one end portion, respectively. The support members 27 are secured on a base 24.

A mounting member 29 in the shape of a rectangle is formed in the other end portion along the length of the vibrating member 23. Here, both end portions of the mounting member 29 are connected to both transversal ends of the other end portion along the length of the vibrating member 23 via first connection sections 31 each substantially in the shape of a narrow L. The two end portions of the mounting member 29 are further connected to the node portion N2 of the other end portion along the length of the vibrating member 23 via two second connection sections 32 substantially in the shape of an L which extend from the first connection sections 31 along the length of the vibrating member 23, and thus the mounting member 29 is formed integrally with the vibrating member 23. Also, two weights 33 for increasing the flexing of the vibrating member 32 due to acceleration are mounted on both main surfaces of the mounting member 29 by welding, soldering or the like. The two weights 33 and mounting member 29 may be regarded as an integrated weight 26 for increasing the flexing of the vibrating member 23 due to acceleration.

When a drive signal in the same phase is applied to the piezoelectric elements 25a to 25d, the vibrating member 23 vibrates in a longitudinal direction. In this case, since the piezoelectric elements 25a and 25b, and the piezoelectric elements 25c and 25d, are polarized in mutually opposite directions, the elements are displaced in mutually opposite directions. For this reason, as indicated by the solid line in FIG. 2, when a portion of the vibrating member 23 extending from the center along the length thereof to the one end portion thereof expands, the portion extending from the center along the length of the vibrating member 23 to the other end portion thereof shrinks. Conversely, as indicated by the dotted line of FIG. 2, when a portion of the vibrating member 23 extending from the center along the length thereof to one end portion thereof shrinks, the portion extending from the center along the length of the vibrating member 23 to the other end portion thereof expands. In this case, since the amount of expansion and shrinkage of the portion of the vibrating member 3 from the center along the length thereof to one end portion thereof cancels the amount of expansion and shrinkage of the portion of the vibrating member 3 from the center along the length thereof to the other end portion thereof, the distance between both end portions along the length of the vibrating member 3 is substantially unchanged. Further, the vibrating member 23 vibrates with the central portion between the piezoelectric elements 25a and 25b and the central portion between the piezoelectric elements 5c and 5d as node portions N1 and N2, respectively. Also, the vibrating member 23 vibrates with both end portions along the length thereof as antinodes (loops).

When the vibrating member 23 of the vibrator 21 undergoes acceleration in a direction perpendicular to the major surfaces of the vibrating member 23, the vibrating member 23 bends according to the acceleration together with the piezoelectric elements 25a to 25d to generate signals on the piezoelectric elements 25a to 25d according to the bending. Some of the signals generated on the piezoelectric elements 25a to 25d may be measured to detect the acceleration. Since the end of the vibrating member 23 is joined to the weights 33, the end of the vibrating member 23 is subjected to a larger force which is proportional to the mass of the weights 33, so that the vibrating member 23 bends more greatly. Thus, the signals obtained from the piezoelectric elements 25a to 25d of the vibrator 21 are large and the acceleration detection sensitivity is high.

In the acceleration sensor of this embodiment, the mounting member 29 and the vibrating member 23 are connected to each other at a total of four places of the first two connection sections 31 and the second two connection section 32. In other words, the integrated weight 26 is attached to the vibrating member 23 through the four narrow connection sections 31 and 32. Thus, the mechanical strength for supporting the integrated weight 26 is increased. Moreover, since the second connection sections 32 are connected to the node portion at which the displacement of the vibration is smallest in the vibrating member 23, the vibration of the vibrating member 23 is almost prevented from transmitting to the integrated weight 26. Further, the first and second connection sections 31 and 32 are formed so thin that the vibration of the vibrating member 23 is easily absorbed thereat.

Thus, when acceleration is applied to the acceleration sensor of this embodiment, the displacement of the weights 33 and 33 due to the acceleration is surely transmitted to the vibrating member 23, while the vibration of the vibrating member 23 is not easily obstructed by the weights 33 and 33 or the integrated weight 26. Accordingly, the sensitivity for detecting acceleration is improved.

Figure 3:
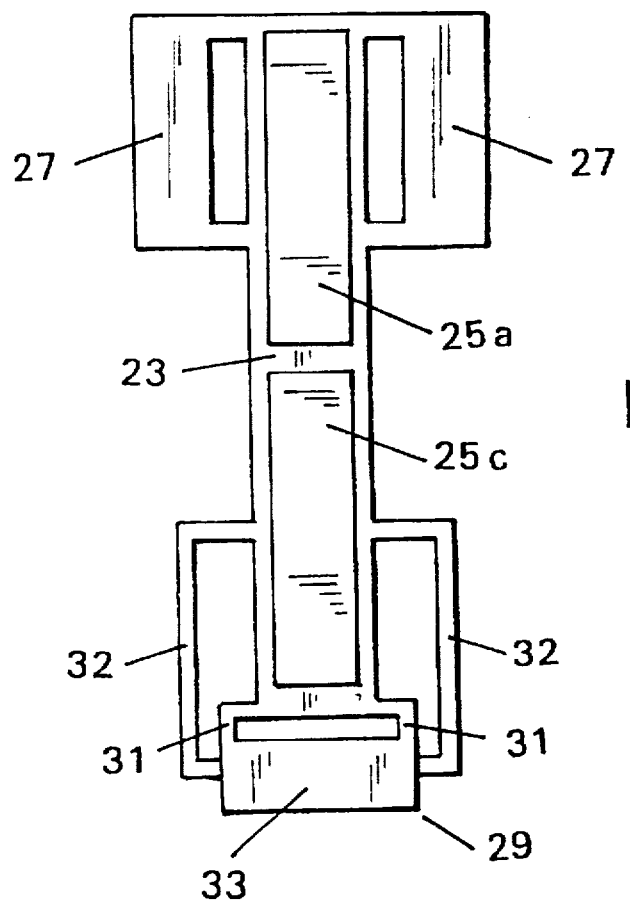
FIG. 3 is a top plan view illustrating a modification of the vibrator of FIG. 1.

In this embodiment, the second connection sections 32 are formed so as to extend from the first connection sections 31 along the length of the vibrating member 23 and are connected to the node portion of the other end portion along the length of the vibrating member 23. However, as shown in FIG. 3, the second connection sections 32 may be formed substantially in the shape of a sideways U in such a manner as to extend directly from both end portions of the mounting member 29 along the length of the vibrating member 23 without going through the connection sections 31 and to be connected to the node portion of the other end portion along the length of the vibrating member 23. The shape of the second connection sections 32 is not particularly limited if the mounting member 29 is connected to the node portion of the other end portion along the length of the vibrating member 23.

That is, as long as the integrated weight for increasing the flexing of the vibrating member 23 is connected to both the end of the vibrating member 23 and the node portion close the end of the vibrating member 23 via narrow connection sections, the shape of the connection sections and the position of the integrated weight to which the connection sections are attached are not limited to the specific shape and positions explained above.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An acceleration sensor, comprising:
    a vibrator having a vibratable member, said vibratable member having a node portion of vibration therein and being vibratable in a longitudinal direction, said vibratable member flexing in response to an applied acceleration;
    a support member, provided in one end portion of said vibratable member, for supporting said vibrator;
    a weight for increasing the flexing of said vibratable member due to acceleration;
    a first connector provided between said weight and an opposite end of said vibratable member; and
    a second connector having a first end for connecting said weight to said node portion of said vibratable member.

2. An acceleration sensor according to claim 1, wherein said second connector has a second end connected to said first connector.

3. An acceleration sensor according to claim 1, wherein said second connector has a second end connected to said weight.

4. An acceleration sensor according to claim 1, wherein said vibratable member is formed in the shape of a strip.

5. An acceleration sensor according to claim 4, wherein said first connector and said second connector are formed in L-shapes.

6. An acceleration sensor according to claim 5, wherein said first connector and said second connector are formed integrally with said vibratable member.

7. An acceleration sensor according to claim 6, wherein said vibratable member includes a plurality of piezoelectric elements.

8. An acceleration sensor, comprising:
    a vibrator having a vibratable member in the shape of a strip, said vibratable member having a node portion of vibration and being vibratable in a longitudinal direction, said vibratable member flexing in response to an applied acceleration and including a pair of opposed major surfaces and a longitudinal axis and first and second spaced piezoelectric elements secured to one of said major surfaces and third and fourth spaced piezoelectric elements secured to the other of said major surfaces;
    a support member, provided in one end portion of said vibratable member, for supporting said vibrator;
    a weight for increasing the flexing of said vibratable member due to acceleration;
    a first L-shaped connector provided between said weight and an opposite end of said vibratable member and formed integrally with said vibratable member; and
    a second L-shaped connector for connecting said weight to said node portion of said vibratable member and formed integrally with said vibratable member.

9. An acceleration sensor according to claim 8, wherein said first and third piezoelectric elements directly oppose one another and wherein said second and fourth piezoelectric elements directly oppose one another.

10. An acceleration sensor according to claim 9, wherein said first and third piezoelectric elements are polarized in a direction toward one another and said second and fourth piezoelectric elements are polarized in a direction away from one another.

11. An acceleration sensor according to claim 10, wherein said first and third piezoelectric elements are disposed on one side of the center of said longitudinal axis and said second and fourth elements are disposed on the opposite side of said center of said longitudinal axis.

* * * * *